United States Patent
Penumatcha et al.

(10) Patent No.: US 8,480,023 B2
(45) Date of Patent: *Jul. 9, 2013

(54) FIBER OPTIC/ELECTRICAL CABLE REEL ASSEMBLY

(75) Inventors: Venkata R. Penumatcha, Plano, TX (US); Vincent A. Wouters, McKinney, TX (US); Rodney M. Flower, Richardson, TX (US)

(73) Assignee: Applied Optical Systems, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/291,916

(22) Filed: Nov. 8, 2011

(65) Prior Publication Data

US 2012/0145821 A1 Jun. 14, 2012

Related U.S. Application Data

(63) Continuation of application No. 12/364,485, filed on Feb. 2, 2009, now Pat. No. 8,074,916.

(60) Provisional application No. 61/063,405, filed on Feb. 1, 2008.

(51) Int. Cl.
   *B65H 75/20* (2006.01)

(52) U.S. Cl.
   USPC ......... 242/604; 242/604.1; 242/608; 242/614

(58) Field of Classification Search
   USPC .............. 242/395, 602, 603, 604, 604.1, 605, 242/608, 613, 613.1, 614, 614.1
   See application file for complete search history.

(56) References Cited

U.S. PATENT DOCUMENTS

| | | | |
|---|---|---|---|
| 3,837,590 A * | 9/1974 | Pollak | 242/407 |
| 4,397,863 A * | 8/1983 | Tidwell et al. | 514/415 |
| 4,451,013 A * | 5/1984 | Bedrosian | 242/118.4 |
| 4,542,862 A * | 9/1985 | Romike et al. | 242/405.1 |
| 4,696,438 A * | 9/1987 | Myers | 242/118.41 |
| 4,796,830 A * | 1/1989 | Gelfman | 242/574.4 |
| 4,880,182 A * | 11/1989 | Gelfman | 242/613 |
| 5,215,279 A * | 6/1993 | Foit | 242/602 |
| 5,335,874 A * | 8/1994 | Shrum et al. | 242/118.4 |
| 5,381,981 A * | 1/1995 | Nelson | 242/407.1 |
| 6,715,710 B1 * | 4/2004 | Russell et al. | 242/605 |
| 7,438,258 B2 * | 10/2008 | Chen | 242/614 |
| 8,074,916 B2 * | 12/2011 | Penumatcha et al. | 242/604 |

* cited by examiner

*Primary Examiner* — Sang Kim
(74) *Attorney, Agent, or Firm* — Robert D. McCutcheon

(57) ABSTRACT

A cable reel or cable reel assembly is provided for storing, deploying, retrieving and transporting a cable assembly (having a cable and connectors). The cable reel includes a central hub and two side flanges constructed, in one embodiment, of composite plastic material having reinforcing material(s). An annular rim and spaced apart spoke sections in each side flange function to provide multiple carrying handles. In a specific embodiment, a secondary hub (and third flange) adjacent the central hub is positioned and disposed within a side periphery defined by the annular rim of one of the side flanges enabling two cable reels to be stacked together such that the annular rims of respective cable reels may be in close or actual contact. In another embodiment, a retractable handle is disposed within the side periphery when in the retracted position.

20 Claims, 13 Drawing Sheets

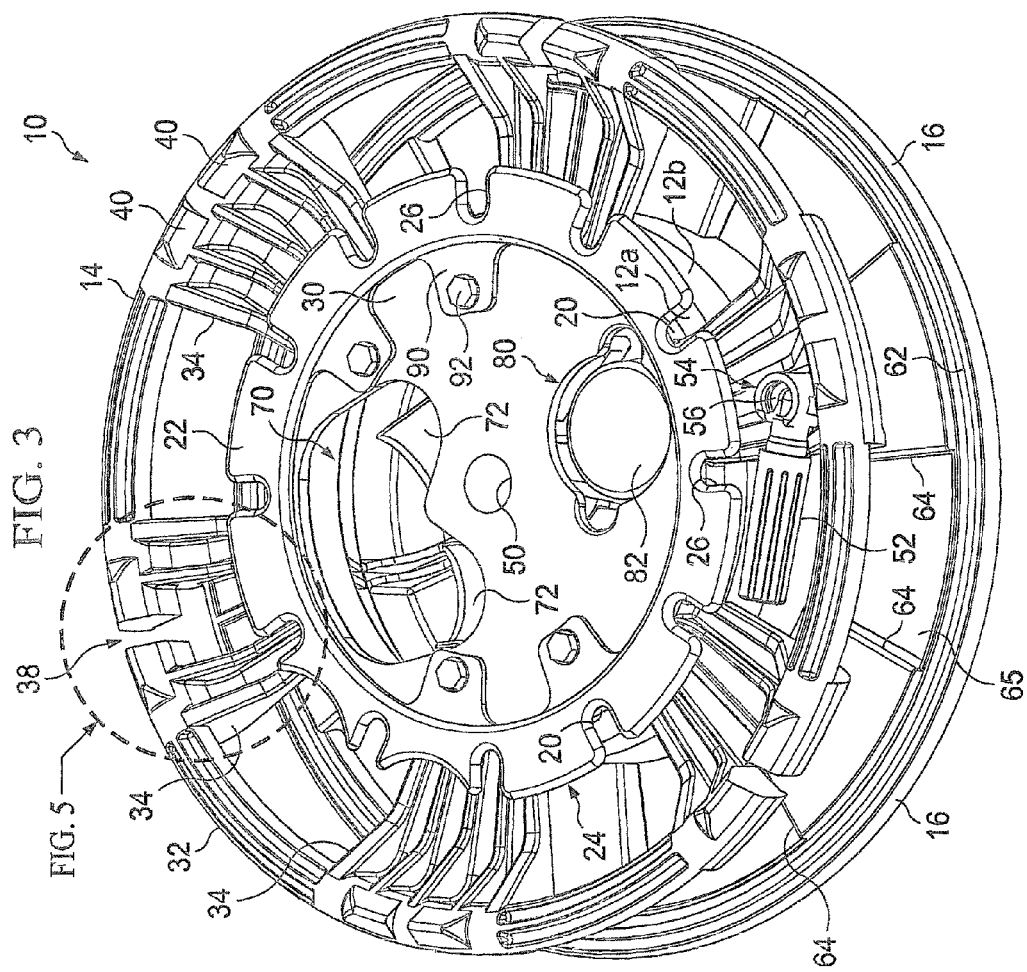

FIBER OPTIC/ELECTRICAL CABLE REEL ASSEMBLY

CROSS-REFERENCE TO RELATED APPLICATION

This application is a continuation of prior U.S. patent application Ser. No. 12/364,485 filed on Feb. 2, 2009, now U.S. Pat. No. 8,074,916 which claims priority under 35 U.S.C. 119(e) to U.S. provisional Application Ser. No. 61/063,405, filed on Feb. 1, 2008, and which are incorporated herein by reference.

TECHNICAL FIELD

The present invention relates generally to fiber optic/electrical cables, and more particularly to cable reel assembly for use in storing, deploying, retrieving and transporting such cables.

BACKGROUND

Prior art cable reel assemblies have been provided for storing and transporting fiber optic and/or electrical cables of substantial length. One well-known cable reel used in most military applications is manufactured by Shane Industries.

Various problems exist with this prior art cable reel, including weight, non-stackability, bulkiness, difficulty in handling, lack of versatility, difficulty of manufacture, etc. Therefore, there exists a need for an improved cable reel assembly that is lower in weight, stackable, less bulky, easy to handle and reel, modifiable, and relatively easy to manufacture.

SUMMARY

In accordance with one embodiment, there is provided a cable reel with a central hub having a first end and a second end, a first flange coupled to the first end of the central hub and having a first annular rim defining an first outer periphery, and a second flange coupled to the second end of the central hub and having a second annular rim defining an second outer periphery and a side periphery. The reel includes a secondary hub adjacent the central hub and having a first end and a second end, the first flange coupled to the first end of the secondary hub, and a third flange coupled to the second end of the secondary hub, wherein the secondary hub and third flange are disposed within the side periphery of the first flange.

In another embodiment, there is provided a cable reel having a central hub having a first end and a second end and a first flange coupled to the first end of the central hub and having a first annular rim defining an first outer periphery, the first annular rim including at least one notch therein for receiving a portion of a cable. The first flange includes a plurality of first spoke sections coupled to the central hub and extending to and coupled to the first annular rim of the first flange, a plurality of first open spaces disposed in the first flange between adjacent first spoke sections, each first open space defined by a portion of the first annular rim and two adjacent first spoke sections, and each first open space and its adjacent portion of the first annular rim is capable of operating as a carrying handle for the cable reel. The reel further includes a second flange coupled to the second end of the central hub and having a second annular rim defining an second outer periphery. The second flange includes a plurality of second spoke sections coupled to the central hub and extending to and coupled to the second annular rim of the second flange, a plurality of second open spaces disposed in the second flange between adjacent second spoke sections, each second open space defined by a portion of the second annular rim and two adjacent second spoke sections, and each second open space and its adjacent portion of the second annular rim is capable of operating as a carrying handle for the cable reel.

In yet another embodiment, there is provided a cable reel assembly having a cable reel and a cable assembly. The cable reel includes a central hub having first and second ends, first and second side flanges coupled to opposite ends of the central hub, each side flange including an annular rim defining an outer periphery and a plurality of spoke sections and a plurality of open spaces disposed between adjacent spoke sections wherein each side space and an adjacent portion of the annular rim are capable of operating as a carrying handle for the cable reel assembly, and wherein at least one of the annular rims of the side flanges includes at least one notch therein, a secondary hub adjacent the central hub and having a first end and a second end, the first flange coupled to the first end of the secondary hub, and a third flange coupled to the second end of the secondary hub such that the secondary hub and third flange are disposed within a side periphery of the first flange defined by the annular rim of the first flange. The cable assembly includes a cable, a first connector and a second connector, the first and second connectors coupled to respective ends of the cable. The cable further includes a first portion wound around the central hub and a second portion wound around a secondary hub.

In still another embodiment, there is provided a cable reel having a central hub having a first end and a second end and a first flange coupled to the first end of the central hub and having a first annular rim defining an first outer periphery, the first annular rim including at least one notch therein for receiving a portion of a cable. The first flange includes at least four first spoke sections coupled to the central hub and extending to and coupled to the first annular rim of the first flange, at least four first open spaces disposed in the first flange between adjacent first spoke sections, each first open space defined by a portion of the first annular rim and two adjacent first spoke sections, and wherein each first open space and its adjacent portion of the first annular rim are capable of operating as a carrying handle for the cable reel. The reel further includes a second flange coupled to the second end of the central hub and having a second annular rim defining a second outer periphery. The second flange includes at least four second spoke sections coupled to the central hub and extending to and coupled to the second annular rim of the second flange, at least four second open spaces disposed in the second flange between adjacent second spoke sections, each second open space defined by a portion of the second annular rim and two adjacent second spoke sections, and wherein each second open space and its adjacent portion of the second annular rim are capable of operating as a carrying handle for the cable reel. The reel also includes a secondary hub adjacent the central hub having a first end and a second end, the first flange coupled to the first end of the secondary hub; a third flange coupled to the second end of the secondary hub; and wherein the secondary hub and third flange are disposed within the side periphery of the first flange.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 3 and 4 are perspective views of the cable reel assembly shown in FIGS. 1 and 2.

FIG. 10A illustrates a reel with a cable assembly having two end connectors in an unstored position, while FIG. 10B illustrates a reel with a cable assembly having two end connectors in a stored position;

DETAILED DESCRIPTION

Figure 2:
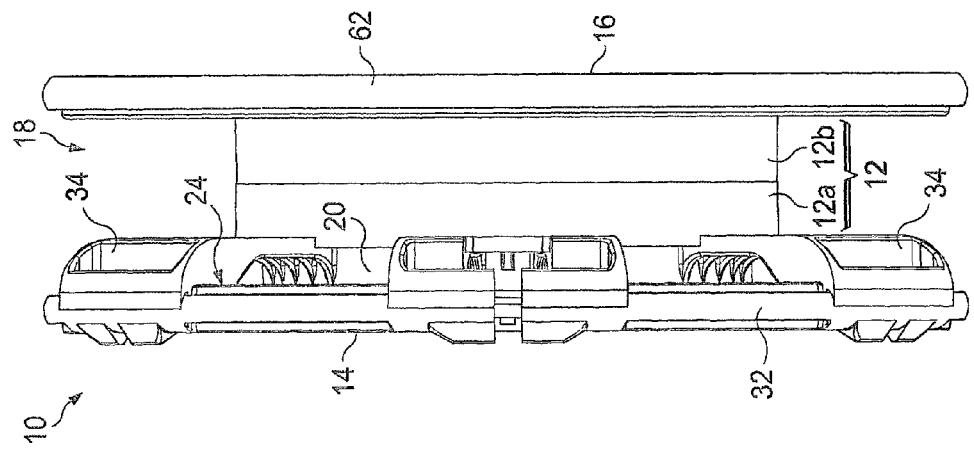
FIGS. 1 and 2 are a side plan and end views, respectively, of a cable reel assembly in accordance with one embodiment of the present disclosure.

Referring to FIGS. 1-4, there are shown various views of a cable reel assembly 10 in accordance with one embodiment of the present disclosure.

Numerous benefits or advantages are provided by various cable reel assembly embodiments described herein. Some of these benefits/advantages include increased durability and strength with light weight, elimination of most environmental damage caused by field deployment (e.g., rusting of metal components), enabling payout of small lengths of cable without requiring entire payout, stacking and interlocking of cable reels for transit and reduced storage requirements, integrated storage and securing of connectors and cable/connector cleaning kits, retractable crank handle system for easy payout and take-up (unspooling, spooling) and storage, and designed to operate with existing reel systems. The novel cable reel assembly(ies) described herein may used in various applications, including mobile emergency telecommunications, mobile tactical shelters, military tactical deployments, broadcast, and emergency restoration and deployable communications, etc.

The cable reel 10 includes a tubular central hub or core (or winding body) 12 (having a first end and a second end), a first generally disc-shaped side flange portion 14 and a spaced apart second generally disc-shaped side flange portion 16. The central hub 12 between the side flange portions 14, 16 defines a space 18 for accommodating a length of cable (not shown) for winding around the hub 12. The ends of the central hub 12 are coupled or connected to the first flange 14 and the second flange 16. The dimensions (diameter, length) of the central hub 12 and the dimensions (diameter) of the first and second side flanges 14, 16 may be any suitable dimensions depending on the desired dimensions (diameter, length) of the cable (e.g., cable diameter of 0.5 inch and length of 300 meters). The central hub 12 and first and second side flanges 14, 16 collectively may be referred to as the main body reel of the cable reel 10.

The first side flange 14 includes a central portion 30 and an annular rim 32 extending around its periphery (defining an other periphery). The annular rim 32 is rigidly fixed to the central portion 30 by a plurality of spoke sections 34. In one embodiment, there are illustrated six spoke sections 34, however, in other embodiments, any different and suitable number of spoke sections 34 may be utilized. As shown, the annular rim 32 is displaced laterally outward from the spokes 34 of the side flange (which functions to maintain a spooled cable (not shown) within the space 18). In other words, the annular rim 32 connects to the spokes 34 at a point that is laterally outward from the point at which the spokes 34 connect with the central portion 30 of the side flange 14. Thus, the spokes 34 are arcuate-shaped.

Between each spoke section 34 is an area or cutout 35 bounded or defined by two adjacent spoke sections 34, a portion of the annular rim 32 and a portion of the central portion 30 of the first side flange 14 (or a portion of the central hub 12). This allows the annular rim 32 to function (at multiple sites) as a mechanism for grasping and carrying the cable reel 10.

The cable reel 10 further includes a secondary tubular hub or core (or winding body) 20 (having a first end and a second end) extending outward from the spokes 34 adjacent the central hub 12 and a third side flange portion 22. The spokes 34 of the first side flange 12 and the third side flange 22 define a space 24 for accommodating a second length of cable (not shown) for winding around the secondary hub 20. These components collectively form a secondary reel of the cable reel 10 for winding a smaller portion of the cable—sometimes referred to as the "cable tether" portion. The ends of the secondary hub 20 are coupled or connected to the first flange 14 and the third flange 22. As shown, the third side flange 22 includes one or more notches 26 on its outer periphery to receive and secure a portion of the cable tether portion near the connector (See, FIGURES and 2). In the embodiment shown, the diameter of the third side flange 22 is less than the diameter of the annular rim 32 of the first side flange 12. As will be appreciated, the diameter of the secondary hub 20 may be less than, equal to, or greater than the diameter of the central hub 12. In one embodiment, the diameter of the secondary hub 20 is less than the diameter of the central hub 12.

In one embodiment, the secondary tubular hub 20 and third side flange 22 are configured and positioned within the volume defined by the annular rim 32 and the spokes 34. Described differently, these two components are structured and located inside a plane defined by the outermost portions of the annular rim 32 and the spokes supporting such rim (or alternatively, described as disposed within a side periphery defined by the annular rim 32). Disposed with a concave volume This functions to allow multiple cable reels 10 to be stacked upon each other and minimize any spacing between adjacent annular rims of two cable reels 10.

Each spoke 34 includes sufficient and suitable material to rigidly attach the annular rim 32 to the central portion 30. As shown, a plurality of reinforcing rib structures 36 are formed within the spokes 34. In the embodiment shown, each spoke 34 includes five reinforcing structures 36, and in another embodiment may only include four structures 36. As will be appreciated, any suitable number and configuration of structures 36 can be readily determined by one of skill in the art to meet the desired strength and weight characteristic(s). As shown, the spokes 34 include the structures on the concave-shaped side (outer side) while the inner side of the spokes 34 is relatively rib-free and/or smooth to allow easier payout and take-up of a cable around the central hub 12 and are also smooth to prevent high stress indenting on the cable which may affect optical transmittance.

The second side flange 16 includes a central portion 60 and an annular rim 62 extending around its periphery (defining an outer periphery). The annular rim 62 is rigidly fixed to the central portion 60 by a plurality of spoke sections 64. In one embodiment, there are illustrated six spoke sections 64, however, in other embodiments, any different and suitable number of spoke sections 64 may be utilized. As shown in the FIGURES, the annular rim 62 is not displaced laterally outward from the spokes 64 as in the case of the first side flange 12 (as described above). In another embodiment (not shown), however, the second side flange 16 may be configured similarly or identical to the first side flange 14 (and may or may not include the secondary hub 20 and/or a similar third side flange 22).

Between each spoke section 64 is an area or cutout 65 bounded or defined by two adjacent spoke sections 64, a portion of the annular rim 62 and a portion of the central portion 60 of the second side flange 16 (or a portion of the central hub 12). This allows the annular rim 32 to function (at multiple sites) as a mechanism for grasping and carrying the cable reel 10.

Each spoke 64 includes sufficient and suitable material to rigidly attach the annular rim 62 to the central portion 60. As shown, a plurality of reinforcing rib structures 66 are formed within the spokes 64. In the embodiment shown, each spoke 64 includes three reinforcing structures 66, and in another embodiment may only include two structures 66. As will be appreciated, any suitable number and configuration of structures 66 can be readily determined by one of skill in the art to meet the desired strength characteristic. As shown, the spokes 64 include the structures on the outer side while the inner side of the spokes 64 is relatively rib-free and/or smooth to allow easier payout and take-up of a cable around the central hub 12.

On the outermost (concave) side of the annular rim 32, there are provided a plurality of raised structures 40. These raised structures 40 enable secure stacking of the cable reel 10 with other cable reels 10. On the innermost side of the annular rim 62, is provided one or more grooves 42. Thus, the grooves 42 of the second side flange 16 mate with, and receive, the raised structures 40 of the first side flange 14. Raised structures 40 and grooves 42 are positioned such that only these features abut during stacking. Other structures and configurations, then that illustrated in the FIGURES are possible, provided they function to centralize, stabilize and secure one cable reel 10 when placed on top of another cable reel 10.

Figure 5:
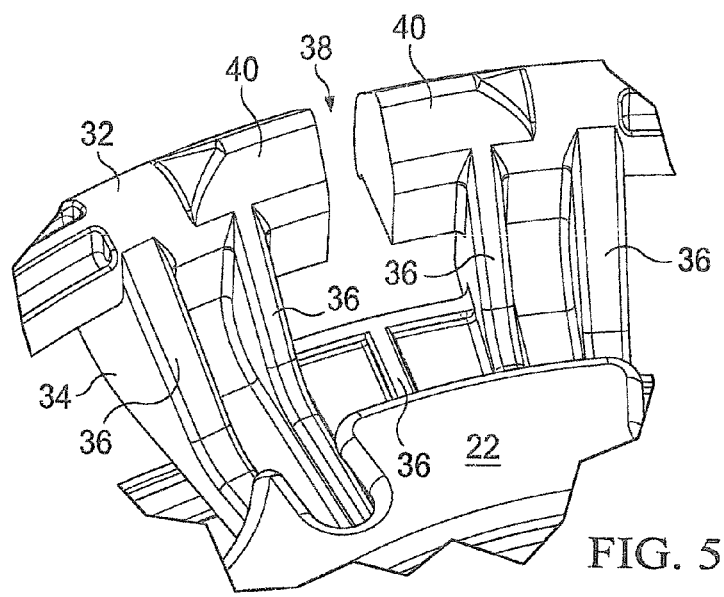
FIG. 5 is a detailed view of a portion of a spoke within the embodiment shown in FIG. 1-4.

Now referring to FIG. 5, there is shown a detail A of one of the spokes 34. At this spoke 34, a portion of the annular rim 32 and a portion of the spoke 34 are removed to form a notch 38 (the notch is formed within the annular rim 32 and spoke 34). As will be appreciated, the cable reel 10 may include any number of notches 38 (including zero). In the embodiment shown, three notches 38 are shown which are positioned at alternating spokes 34). In another embodiment (not shown), the number of notches 38 equal the number of spokes 34 and include a portion of the spokes 34. When included, the notch (es) 38 are configured to receive a cable (not shown) and allow the cable/connector to be brought into the area for storage. The notch(es) 38 allow an extended cable to be wound up in either direction (unidirectional—the cable reel 10 does not need to be turned around to be wound in a specific direction). In one embodiment, the dimension of the notch 38 in the annular rim 32 is less than about 1 inch, and in another embodiment is less than about 0.5 inch, and in another embodiment is about 0.5 inch. Further, in the embodiment shown, the notch 38 is T-shaped which decreases the likelihood that the cable positioned therein will easily slide out of the notch 38. In addition, the cable may can be wound in either direction on the central hub 12 or secondary hub 20.

The cable reel 10 includes a central arbor hole 50 for mounting the reel on an arbor or spindle (not shown) when used to wind or unwind cable from the cable reel 10. Though illustrated as circular, the arbor hole 50 may be square or other shape.

The cable reel 10 includes a retractable handle 52. The handle 52 is mounted within a handle base 54 that is integrally formed within one of the spokes 34. In its retracted position, the handle 52 is oriented in a plane parallel to the plane of the first side flange 12. In its extended position, the handle 52 is oriented substantially at a 90 degree angle to this plane (See, FIG. 3, extends laterally outward from the cable reel 10)). Furthermore, when in the retracted position, the base 54 and the handle 52 are structured and positioned to fall inside a plane defined by the outermost portions of the annular rim 32. This similarly allows multiple cable reels 10 to be stacked upon each other without impinging on the handle 52 or base 54. In one embodiment, the handle base 54 is cylindrical in shape and includes a notch 56 for the handle 52 to move between the retracted and extended positions. Though shown as integrally formed into the first side flange 14, the handle base 54 may also be configured as a separate component and attached in any conventional method in other embodiments. The handle may be free to pivot or nonpivot to function, and may be fit in the grip of the user's hand.

Though not illustrated, multiple bases 54 may be included at different locations on the cable reel 10 to allow for multiple handles 54 at different locations or allow a single handle to be removably moved to a different location.

Within the central portion 30 of the first side flange 14, there exists a first opening within a wall of the central portion 30 leading to a first interior area or volume 70 within the cable reel 10 (within the interior volume(s) defined and inside of the central hub 12 and/or the secondary hub 20). The area or volume 70 is configured and of suitable size and volume to store the connectorized end(s) of a cable wound about the central hub 12 and/or secondary hub 20. The connector storage 70 may further include a structural mechanism therein that secures the cable connector ends within this storage area. This mechanism may be any structure determined to be suitable, configured and/or that functions to secure any particular connector or device ends therein. Such mechanism may include one or more securing straps 72, ties or other nesting or restraint structures known to those skilled in the art.

A second opening within the wall of the central portion 30 leads to a second interior area or volume 80 within the cable reel 10 (within the interior volume(s) defined and inside the central hub 12 and/or secondary hub 20). The area or volume 80 is configured and of suitable size and volume to store other objects, such as a cleaning kit 82. The cleaning kit 82 may include a plastic jar or container with cleaning kit components (not shown) stored therein and suitable for cleaning or maintenance of portions of the cable and connector end or other devices.

In one embodiment, substantially all of the cable reel 10 is constructed of three main components which include the first, second and third side flanges 14, 16 and 22. In this embodiment, the first side flange 14 is integrally formed of one-piece or unitary construction and is a single solid component that includes the annular rim 32, the spokes 34, the central portion 30, a first portion 12a of the central hub 12, and the secondary hub 20. Similarly, the second side flange 16 is integrally formed of one-piece or unitary construction and is a single solid component that includes the annular rim 62, the spokes 64, the central portion 60 and a second portion 12b of the central hub 12. Likewise, the third side flange 22 is integrally formed of one-piece or unitary construction and is a single solid component, and further includes attachment members 90. One or more threaded bolts 92 (extending through the members 90 and the central portions 30, 60) are utilized in conjunction with threaded nuts 94 embedded or restrained within the central portion 60 to rigidly fasten the three side flanges 14, 16, 22 together, as shown. Properly sized spacers (not shown) placed around the bolts 92 and extending between the central portions 30, 60 may be utilized. Thus, the cable reel 10 may be easily assembled and disassembled (e.g., using the four bolts as shown in the embodiment illustrated in FIGS. 1-4). Two-piece bolts may be made of shaft a nut feature attached to the shaft head end to provide an infinite array of bolt lengths to be quickly fabricated. As will be appreciated, other or additional fastening components may be utilized to couple the flanges together.

In the embodiment shown, the flanges 14, 16 and 22 are constructed of plastic material (thermoset, thermoplastic) with reinforcing material(s) with suitable additives such as flame retardants, fungicides and colorants. In one embodiment, the plastic material is polypropylene. Other suitable plastic material(s) may be utilized. Reinforcing material(s) function to provide additional strength to the plastic material. In one embodiment, glass fibers or nylon may be used. Additional or other suitable reinforcing materials may also be used, including carbon. The flanges 14, 16, 22 and may be constructed or formed using any known process, including injection molding, extrusion, thermal forming, casting, liquid injection molding, or our suitable manufacturing methods. Suitable molds or dies may be constructed and used in accordance with whichever process is selected. In one embodiment, the flanges 14, 16, 22 are constructed or formed in an injection molding process and made of polypropylene with one or more reinforcing materials therein. As will be appreciated, in other embodiments, some or all of the components may be constructed of metal, ceramic, plastic or combination thereof.

Though not shown in the FIGURES, the third side flange 22 includes an annular ring having an inner surface and suitable diameter for coupling to the outer surface of the secondary hub 20.

In some embodiments, the third side flange 22 may be constructed integrally with the first side flange 14 and/or each of the first, second and third side flanges 14, 16, 22 may be constructed or formed of one or more separate and distinct components or pieces. In another embodiment, the third side flange 22 may be omitted and the cable reel 10 is formed of the two main flanges (i.e., halves) 14, 16.

In another embodiment (not shown), the central hub 12 may be formed of the portions 12a and 12b and a third portion coupled to and between the portions 12a and 12b for increasing the capacity (cable length capacity or diameter capacity) of the cable reel 12. The portion 12c is cylindrical-shaped and configured to fit or mate to the portions 12a, 12b. This may be accomplished by configuring the portion 12c to fit around the outer surface of the portions 12a, 12b (e.g., having an inner surface diameter substantially equal to the outer surface diameter of the portions 12a, 12b), to fit within the inner surfaces of the portions 12a, 12b (e.g., having an outer surface diameter substantially equal to the inner surface diameter of the portions 12a, 12b), or to include a step up/down portion at the outer ends of the portion 12c.

One particular cable reel 10 as described in FIGS. 1-5 is a cable reel manufactured by and available from Applied Optical Systems, Inc, Plano, Tex., under part number AFO-0100-T-M-1, which is incorporated herein by reference, or AFO-0X00-T-M-1. Additional publications and publicly available documents describe the cable reel available from Applied Optical Systems, Inc., which are incorporated herein by reference.

Referring to FIGS. 6-9, there are shown various views of another embodiment of a cable reel assembly 100 in accordance with the present disclosure. The cable reel 100 is similar to the cable reel 10 illustrated in FIGS. 1-5 and like numbers designate like objects.

The cable reel 100 includes a tubular central hub or core (or winding body) 102 (having a first end and a second end), a first generally disc-shaped side flange portion 104 and a spaced apart second generally disc-shaped side flange portion 106, and may include the third side flange 22. The ends of the central hub 102 are coupled or connected to the first flange 104 and the second flange 106. The dimensions (diameter D, length A) of the central hub 102 and the dimensions (diameter) of the first and second side flanges 104, 106 may be any suitable dimensions depending on the desired dimensions (diameter, length) of the cable (e.g., cable diameter of 0.5 inch and length of 500 meters).

The side flanges 104, 106 are similar to the side flanges 14, 16 (in FIGS. 1-4) but do not include the first and second central hub portions 12a, 12b integrally formed with the side flanges 104, 106, respectively. Inner faces 114, 116 of each side flange 104, 106 include an arcuate groove 120, 122 (not shown) within the inner surface of each side flange 104, 106, respectively. The grooves 120, 122 may be similar to the groove 96 on the outer surface of the second flange 16 (see FIG. 4). Groove 120 is configured to accept a first end 110 of the central hub 102 therein, and groove 122 is configured to accept a second end 112 of the central hub 102 therein. Thus, each of the side flanges 104, 106 includes a structure configured for accepting (and reducing lateral movement) an end of the central hub 102.

The inclusion of the central hub 102, as distinct and separate component from the first and second side flanges 014, 106, allows for easy manufacture of cable reels 100 having different capacity and allows for capacity modification or changes to be made in the field (e.g., removal and replacement of a different sized hub 20).

In one embodiment, the grooves 120, 122 are continuous around a circumference or may be discontinuous. Though grooves are illustrated, each inner face 114, 116 may include a single (or multiple) annular ring protruding from the inner face surface that functions to contact either the inner or outer surfaces of the central hub 102 at its ends. Other structure(s) may be formed on or in the inner surfaces 114, 116 to provide this functionality.

Similar to the cable reel 10, the cable reel 100 includes two distinct storage areas—identified by reference numerals 70a and 70b—for storing the connector ends of a cable. The cable reel 100 may also include a structural mechanism therein that secures the cable connector ends within these storage areas, such as the one or more straps 72 of the cable reel 10. Alternatively, in the embodiment of the cable reel 100 illustrated in FIGS. 6-9, the opening therein may be configured with a rubber cover with flaps (similar to the insert covering the input to a kitchen garbage disposal). This mechanism may be any structure determined to be suitable, configured and/or that functions to secure the connector ends therein. Such mechanism may include any structure(s) shown in the Figures or other structures known to those skilled in the art.

The central hub 102 may be constructed of any suitable material(s), such as metal, plastic or a combination thereof. In one embodiment, the central hub 102 is formed of plastic material with one or more reinforcing materials for added strength.

Figure 10A:
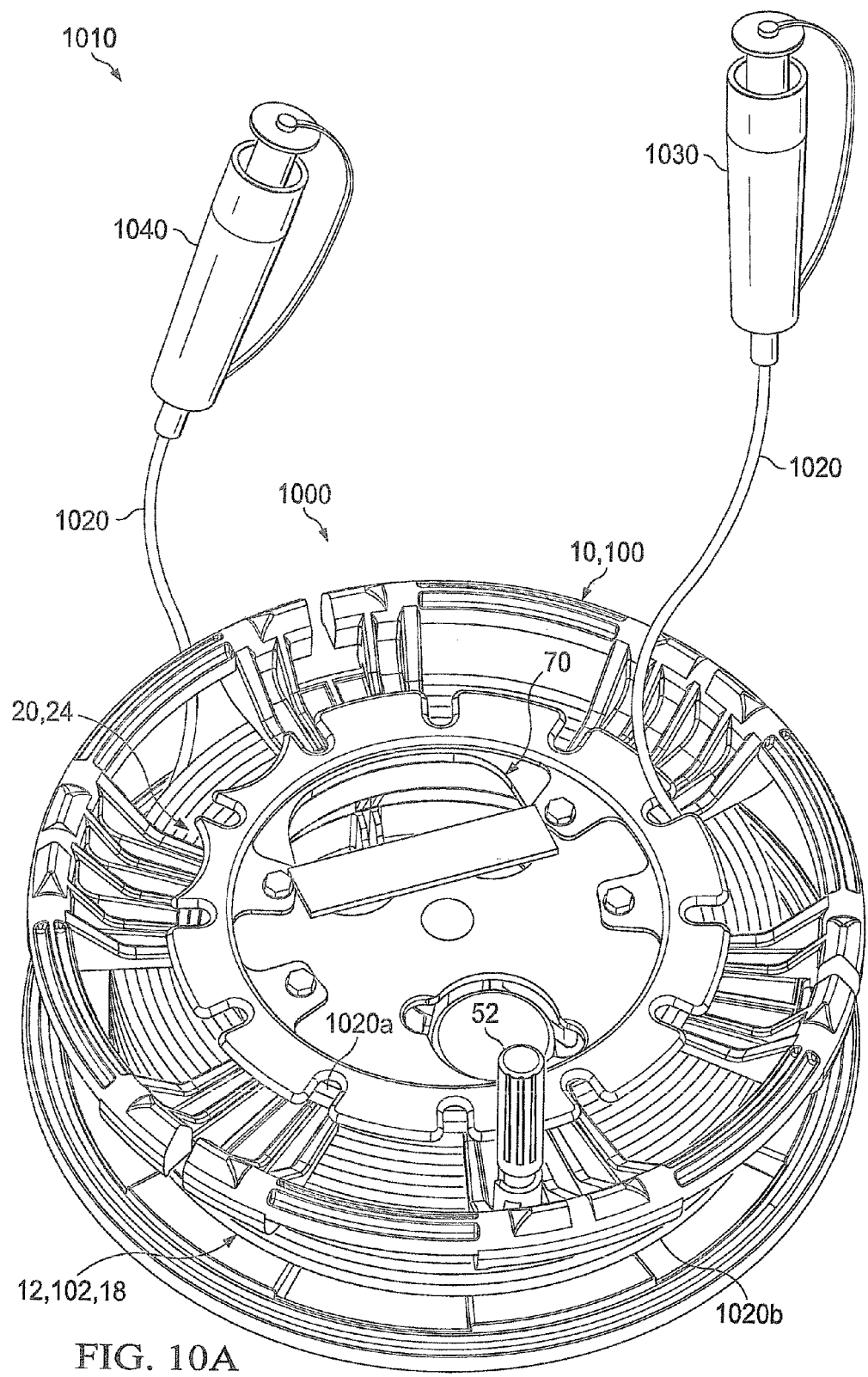
FIGS. 10A and 10B are perspective views illustrating a cable reel assembly of the present disclosure with a cable assembly mounted or stored thereon.
Figure 10B:
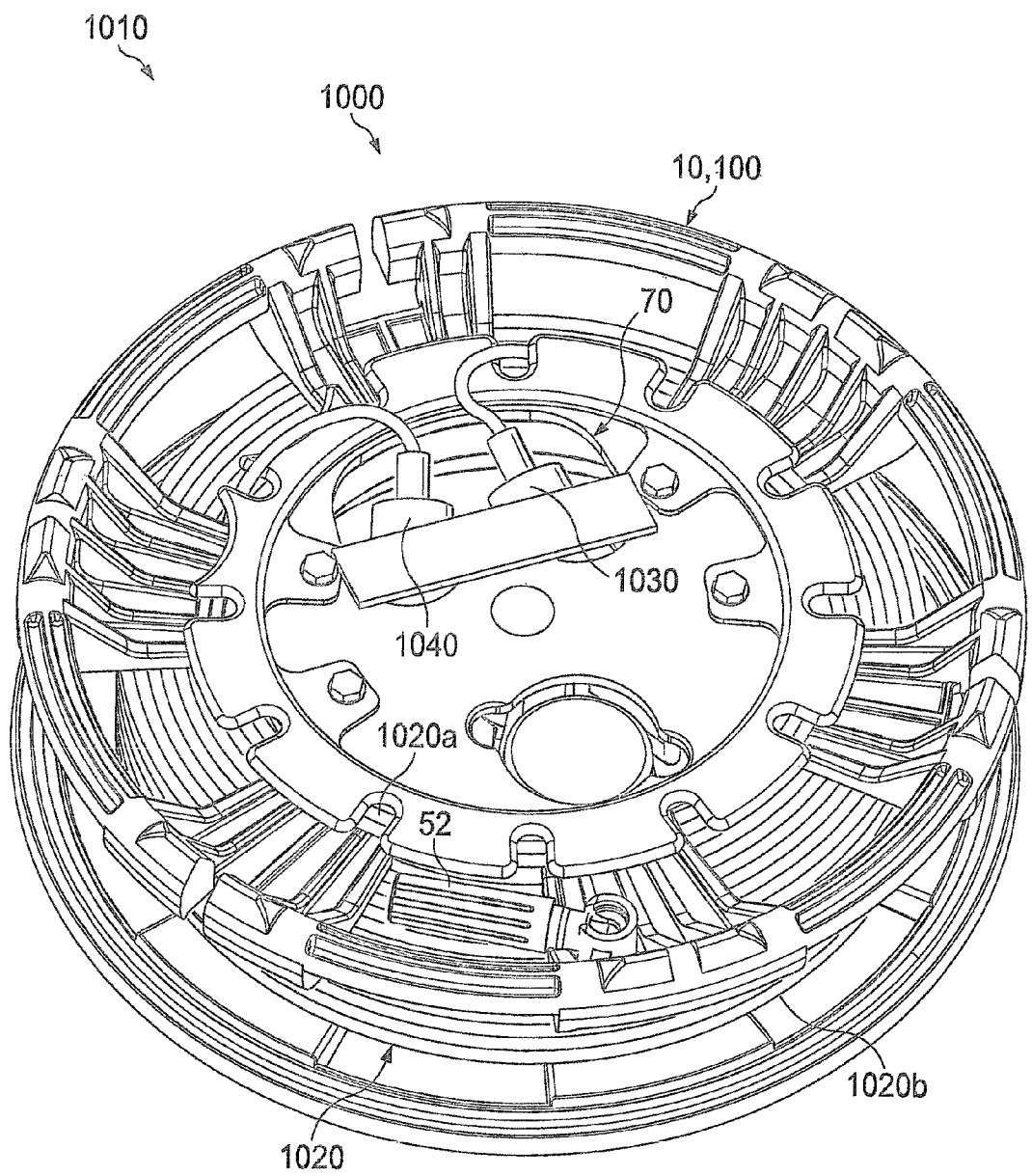

Now referring to FIGS. 10A and 10B, there are shown perspective views illustrating a cable reel assembly 1000 in accordance with the present disclosure. The cable reel assembly 1000 includes the cable reel 10, 100 and a cable assembly 1010 wound thereon. The cable assembly 1010 includes a predetermined length of cable 1020 having a first end connector 1030 and a second end connector 1040. As will be appreciated, any type, of cable assembly 1010 may be mounted or stored on the cable reel 10, 100, such as a cable having optical fiber(s), electrical conductor(s) or combinations (hybrid) thereof (including single or multi-channel). Though the cable reel 10, 100 is illustrated as carrying a cable assembly mounted or wound thereon, the reel 10, 100 may be used with other materials or components capable of being wound thereon, such as rope, steel cable, chains, etc. (all referred to as "wound material"). FIG. 10A illustrates the cable assembly 1010 wound thereon with the two end connectors 1030, 1040 of the cable assembly 1010 in an unstored position, as shown. FIG. 10B illustrates the two end connectors 1030, 1040, as shown.

In both FIGS. 10A and 10B, a portion 1020a of the cable 1020 is wound around the secondary hub 20 within the area 24, and another portion 1020b of the cable 1020 is shown wound around the main central hub 12, 102 within the area 18. In the stored configuration, the connectors 1030, 1040 are disposed and secured within the storage area 70 of cable reel 10 (or would be stored and secured within storage areas 70a, 70b of the cable reel 100).

Figure 11:
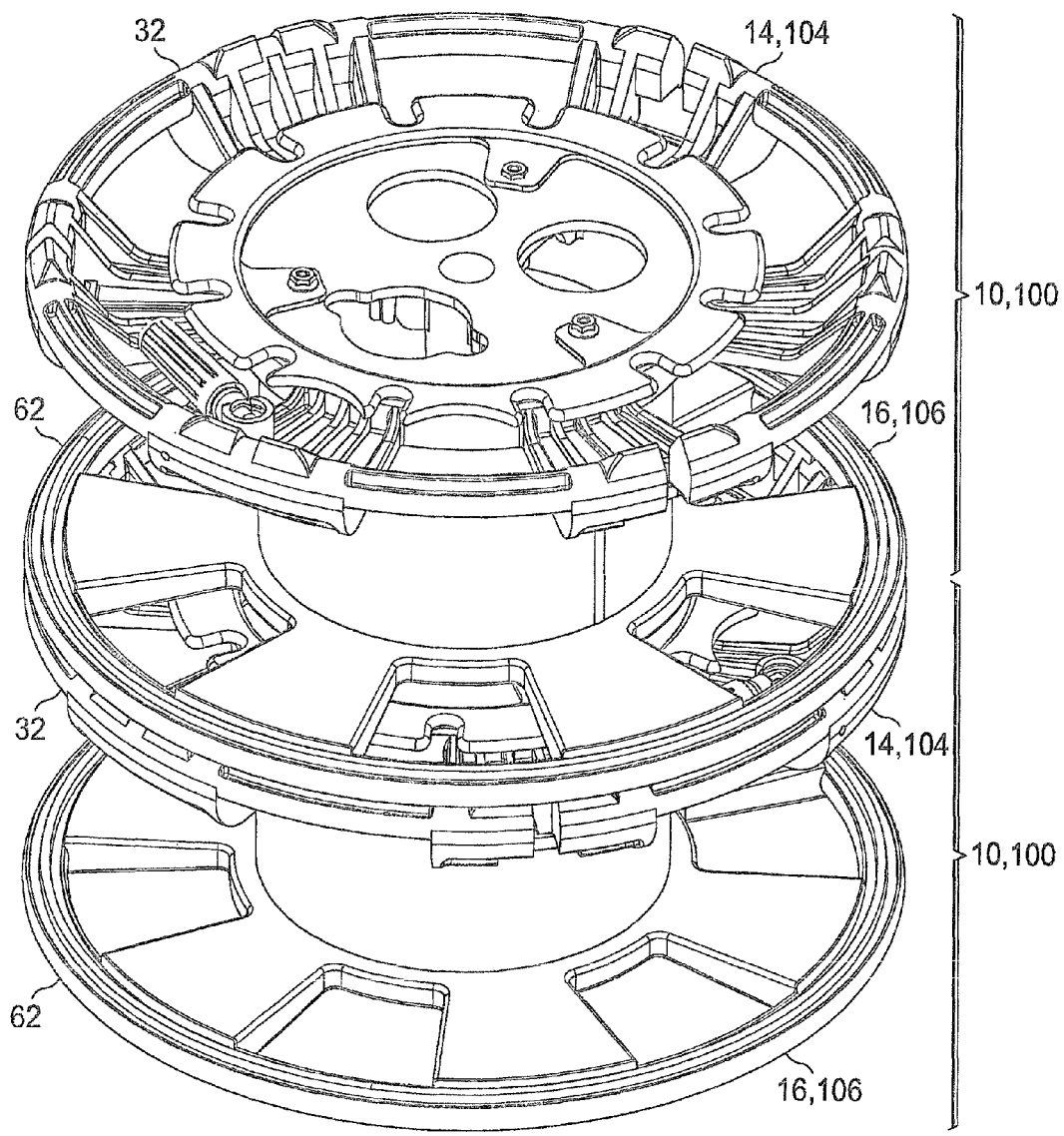
FIG. 11 is a perspective view illustrating two cable reel assemblies stacked on one another.

Now referring to FIG. 11, there is provided a perspective view illustrating a cable reel stacked vertically on top of another cable reel 10,100. The cable reels 10, 100 are shown with the side flanges 16, 106 oriented downward, but could also be oriented with the side flanges 14, 104 downward. When stacked, the raised structure(s) 40 protruding outward from the annular rim 32 of the first side flange 14, 104 of one cable reel 10, 100 nests or mates within the groove 96 in the annular rim 62 of the second side flange 14, 104 of the other cable reel 10, 100 (See FIGS. 3, 4, 8, 9). Because the secondary hub 20, third side flange 22 and retractable handle 52 fit within the outer periphery defined by the annular rim 32 of the first side flange 14, 104, multiple cable reels s10, 100 may be stacked or placed on each other and reducing the amount of volume required during storage or transit. The groove 96 and raised structure(s) 40 function to prevent lateral movement or sliding of one cable reel 10, 100 with respect to the adjacent stacked cable reel 10, 100. Due to the novel configuration of the cable reels 10, 100, various components can be disposed in volume/area between a side flange 14, 104 of one reel and the adjacent/stacked side flange 16, 106 of another reel and still allow the annular rimes 32, 62 of the respective side flanges to substantially contact each other (or be placed near, e.g. about 0.3 inches or less, from each other). This minimizes the space needed for storage and transit of multiple cable reels 10, 100 and further protects and encloses the tether portion 1020a of the cable assembly 1010 wound on the secondary hub 20, as well as the two connectors 130, 1040, during storage or transit.

Figure 12:
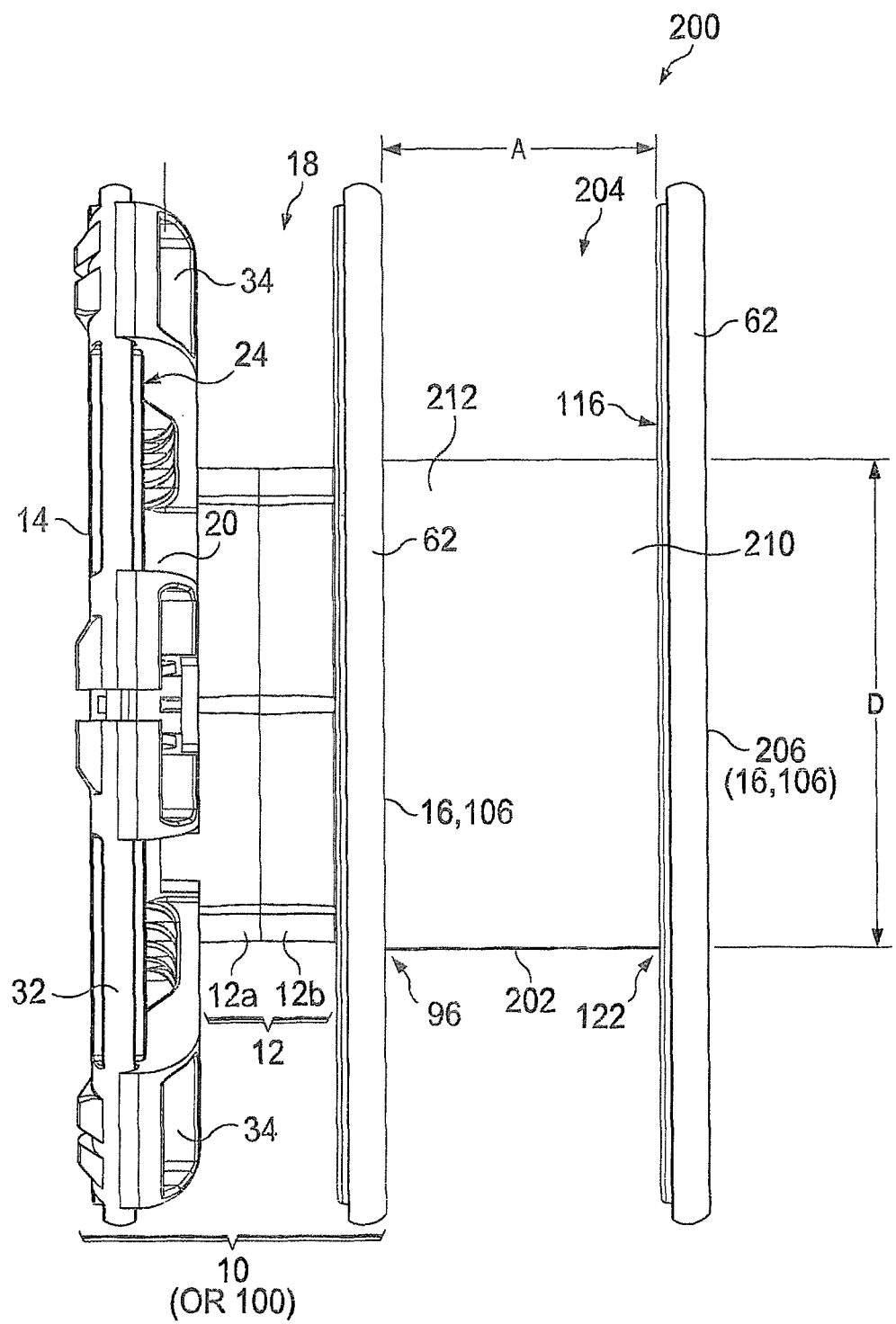
FIGS. 12 and 13 are a side plan and end views, respectively, of another embodiment of a cable reel assembly in accordance with the present disclosure.
Figure 13:
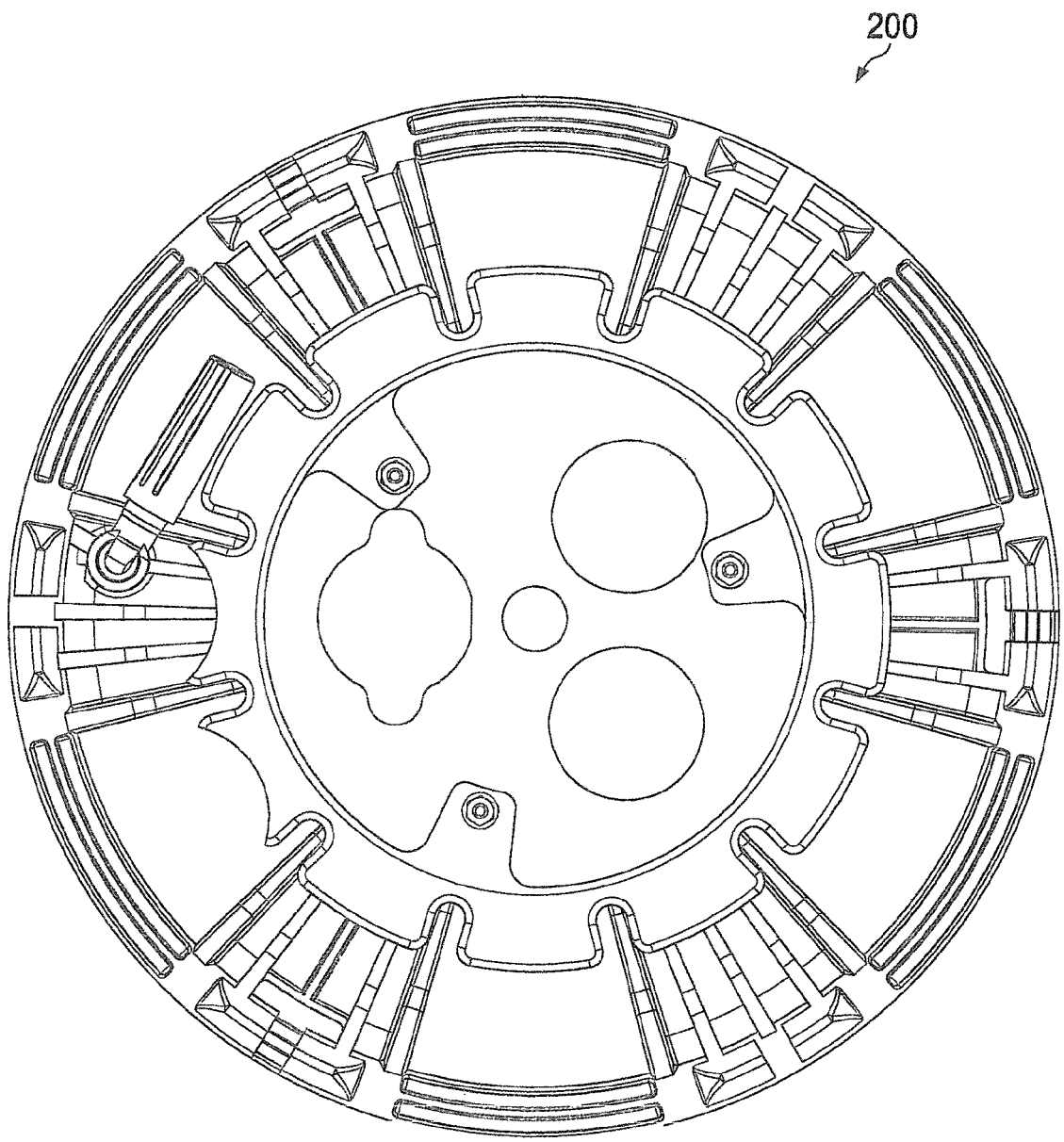
Figure 14:
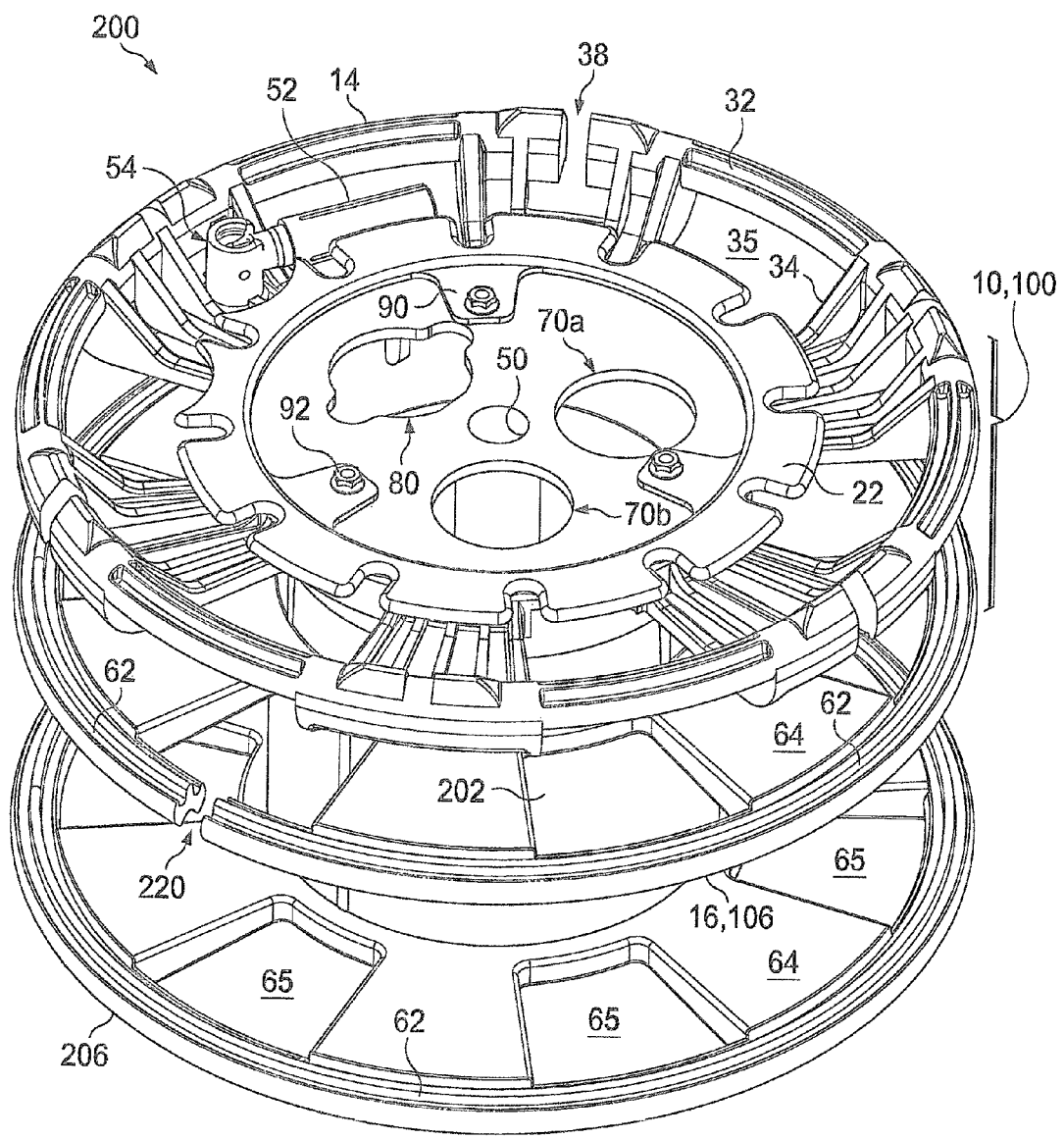
FIG. 14 is a perspective view of the cable reel assembly shown in FIGS. 12 and 13.

Now referring to FIGS. 12-14, there are shown various views of another embodiment of a cable reel 200 in accordance with the present disclosure. Most of the components of the cable reel 200 are similar to the cable reels 10, 100 illustrated in FIGS. 1-9, and like numbers designate like objects.

The cable reel 200 includes the central hub 12, the first side flange 14 and the spaced apart second side flange 16, and may include the third side flange 22 (collectively, the cable reel 10). The cable reel 200 additionally includes a second central hub 202 and a fourth generally disc-shaped side flange portion 206 spaced apart from the second side flange 16. The second central hub 202 between the side flange portions 16, 206 defines a space 204 for accommodating a length of cable (not shown) for winding around the hub 202. The dimensions (diameter D, length A) of the second central hub 202 and the dimensions (diameter) of the side flange 206 may be any suitable dimensions depending on the desired dimensions (diameter, length) of the cable (e.g., cable diameter of 0.5 inch and length of 1000 meters). As will be appreciated, the second central hub 202 provides additional capacity to the cable reel 10 thereby forming the cable reel 200. In another embodiment, the side flange identified in FIGS. 12-14 by reference numeral 16 may be the same or similar to side flange 106.

The fourth side flange 206 may be the same or similar to the second side flange 106 (that does not include the central hub portion 12b) or second side flange 16 (that includes another hub portion 12b integrally formed) shown in preceding FIGURES. The inner face/surface 116 of the flange 206 may include the arcuate groove 122 (previously described) while the outer surface of the flange 16 includes the arcuate groove 96 (see FIG. 4). Groove 122 is configured to accept a first end 210 of the second central hub 202 therein, and groove 96 is configured to accept a second end 212 of the second central hub 202 therein. Thus, each of the side flanges 206 and 16 includes a structure configured for accepting (and reducing lateral movement) an end of the central hub 202.

The inclusion of the second central hub 202, as a distinct and separate component from the first and second side flanges 206, 16 allows for easy manufacture of cable reels 200 having different and additional capacity (on an existing cable reel 10, 100) and allows for capacity modification or changes to be made in the field (e.g., removal and replacement of a different sized hub 202).

Though the embodiment of the cable reel 200 illustrated in FIGS. 12-14 includes the cable reel 10, other embodiments of the cable reel 200 may utilize the cable reel 100 in place of the cable reel 10. It will be understood that additional hubs and flanges may be added to the cable reel 200 for additional capacity.

Figure 1:
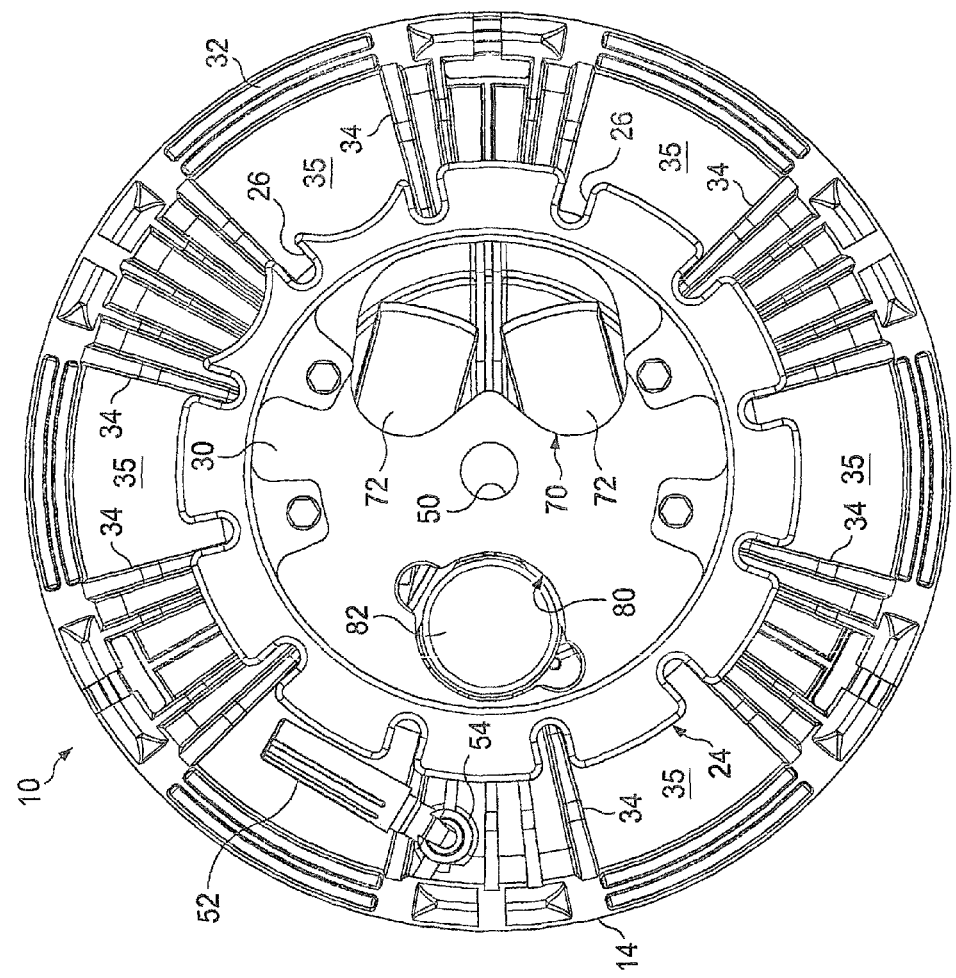
Figure 4:
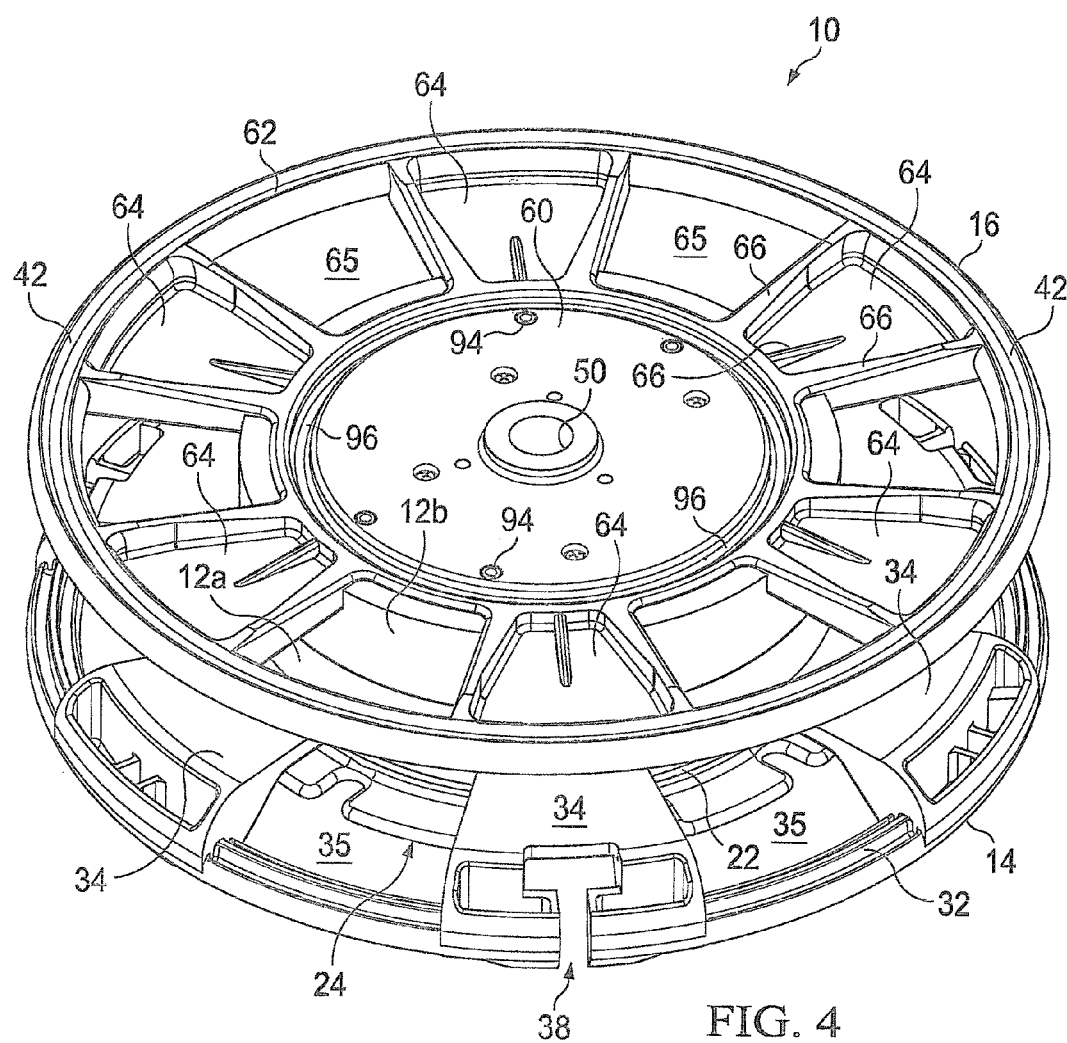
Figure 6:
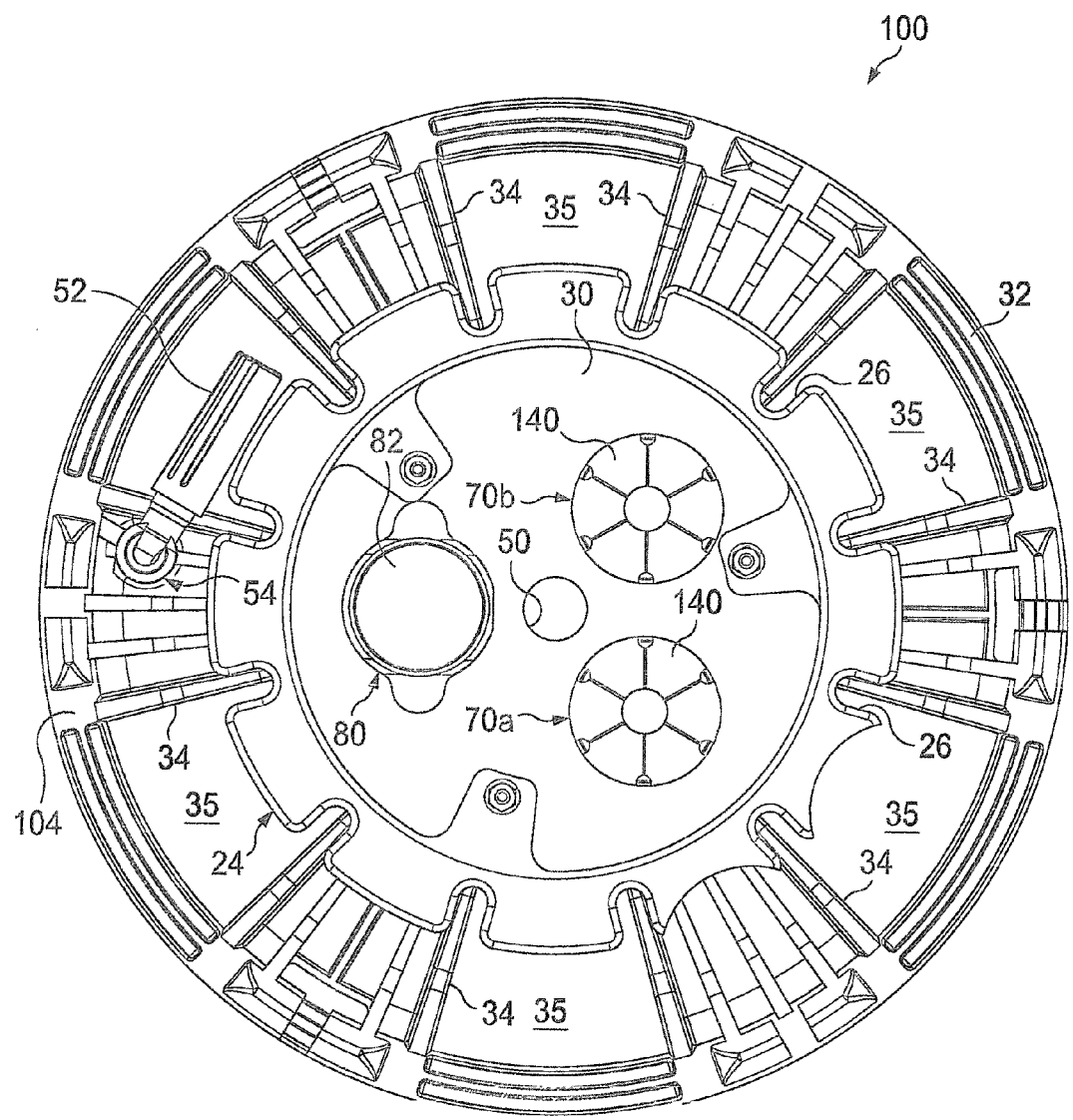
FIGS. 6 and 7 are side plan and end views, respectively, of a cable reel assembly in accordance with another embodiment of the present disclosure.
Figure 7:
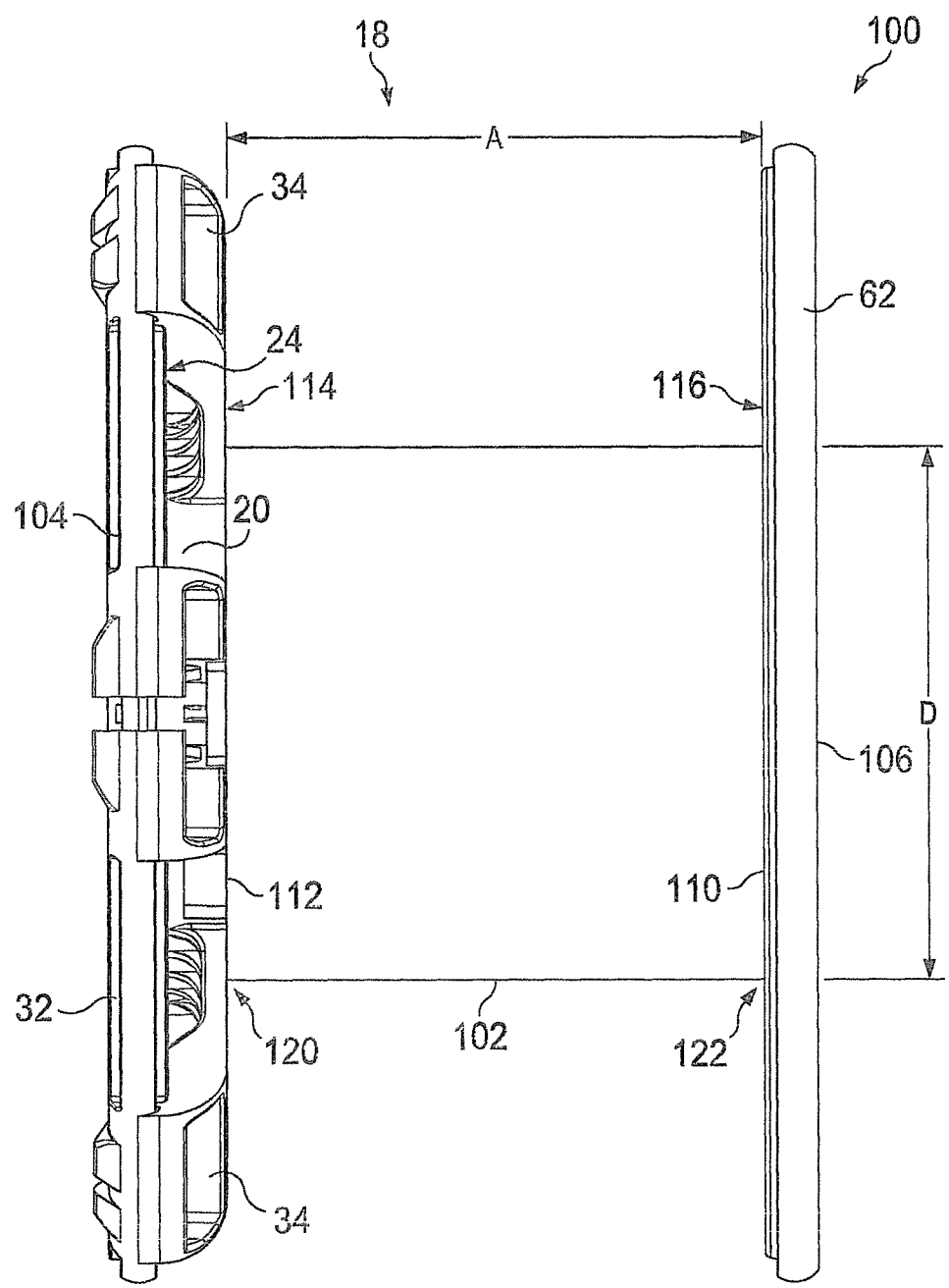
Figure 8:
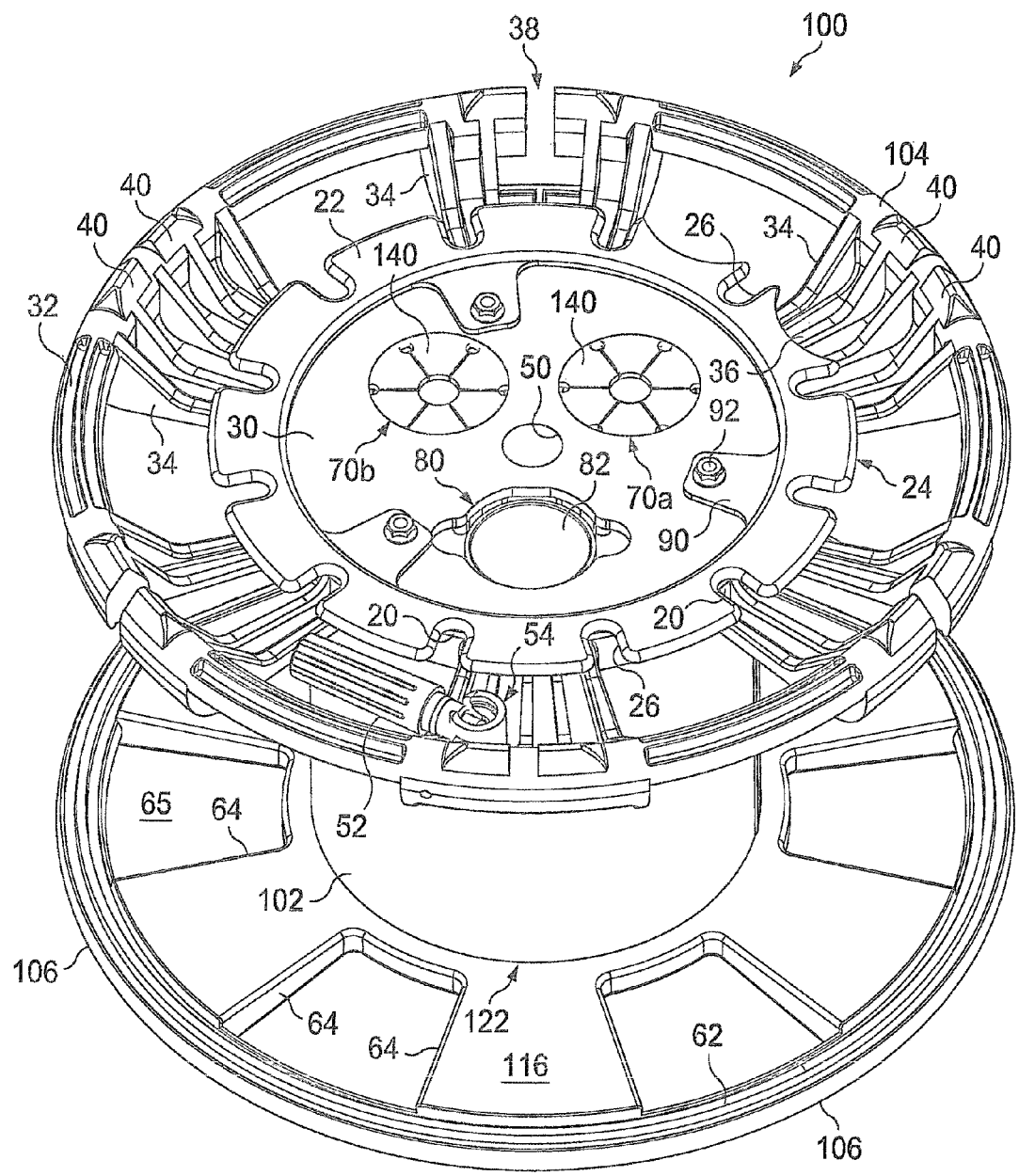
FIGS. 8 and 9 are perspective views of the cable reel assembly shown in FIGS. 6 and 7.
Figure 9:
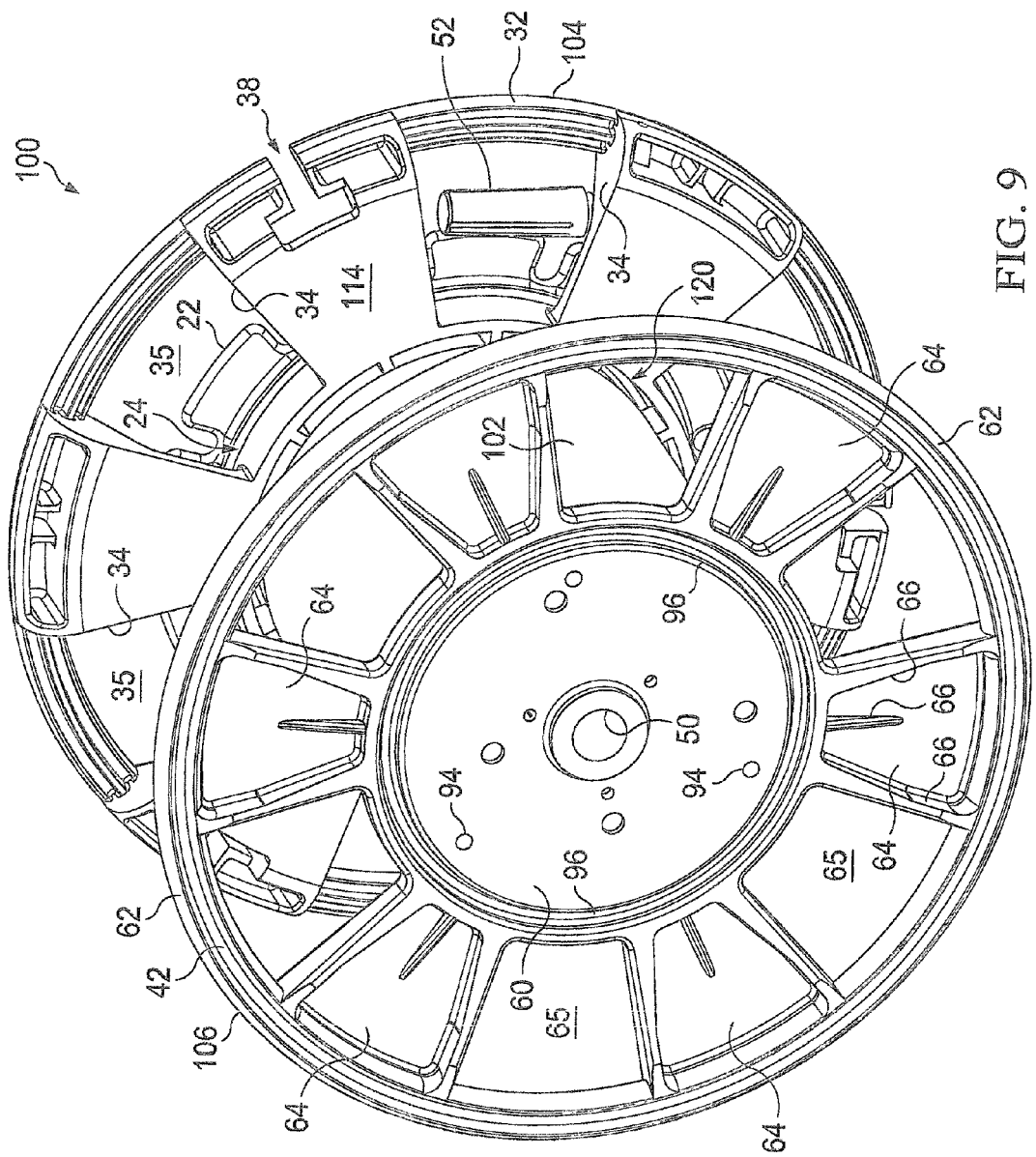

It will be appreciated that FIG. 13 illustrates the side view of the cable reel 200 and is the same or similar to either FIG. 1 or FIG. 6 (depending on the specific configuration whether the cable reel 10 or 100 is utilized) as a component of the cable reel 200, and therefore, no additional identifying references have been added to FIG. 13.

With reference to FIG. 14, there is shown a perspective view of the cable reel 200 (for brevity, not all like and similar elements shown in other FIGURES are identified with reference numerals in FIG. 14). FIG. 14 additionally shows a space or passageway 220 formed within the annular rim 62 of the flange 16, 106. This enables a cable to be placed through the passageway into the area 65 for reeling and unreeling. As will be appreciated the cable wound on the second central hub 202 maybe a portion of a single continuous cable or may be a second cable connected (using two end connectors) to a first cable (or more) wound on the main central hub 12.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A cable reel comprising:
   a central hub having a first end and a second end and a surface;
   a first flange coupled to the first end of the central hub and having a first annular rim defining a first outer periphery, the first annular rim including at least two notches therein for receiving a portion of a cable, the first flange comprising,
      a plurality of first spoke sections coupled to the central hub and extending to and coupled to the first annular rim of the first flange,
      a plurality of first open spaces disposed in the first flange between adjacent first spoke sections, each first open space defined by a portion of the first annular rim and two adjacent first spoke sections, each first open space disposed between the first annular rim and the surface of the central hub, and
      wherein each first open space and its adjacent portion of the first annular rim are capable of operating as a carrying handle for the cable reel; and
   a second flange coupled to the second end of the central hub and having a second annular rim defining a second outer periphery, the second flange comprising,
      a plurality of second spoke sections coupled to the central hub and extending to and coupled to the second annular rim of the second flange,
      a plurality of second open spaces disposed in the second flange between adjacent second spoke sections, each second open space defined by a portion of the second annular rim and two adjacent second spoke sections,
      wherein each second open space and its adjacent portion of the second annular rim are capable of operating as a carrying handle for the cable reel; and
   wherein at least one of the notches is disposed in the first annular rim of the first flange and disposed within a portion of a spoke section, the spoke section rigidly securing the first annular rim to a central portion of the first flange.

2. The cable reel in accordance with claim 1 further comprising:
   a secondary hub adjacent the central hub and having a first end and a second end, the first flange coupled to the first end of the secondary hub;
   a third flange coupled to the second end of the secondary hub; and
   wherein the secondary hub and third flange are disposed within a side periphery of the first flange defined by the first annular rim of the first flange.

3. The cable reel in accordance with claim 1 wherein the central hub comprises a first portion and a second portion;
   the first portion of the central hub and the first flange comprise plastic reinforced material and are formed together as a single unitary piece; and
   the second portion of the central hub and the second flange comprise plastic reinforced material and are formed together as a single unitary piece.

4. The cable reel in accordance with claim 1 further comprising a retractable handle.

5. The cable reel in accordance with claim 1 wherein the number of first spoke sections equals four or more and the number of first open areas equals four or more.

6. The cable reel in accordance with claim 1 wherein each notch is disposed in the first annular rim of the first flange and disposed within a portion of a spoke section, the spoke section rigidly securing the first annular rim to a central portion of the first flange.

7. A cable reel assembly comprising:
   a cable reel, the cable reel comprising,
   a central hub having a first end and a second end and a surface;
   a first flange coupled to the first end of the central hub and having a first annular rim defining a first outer periphery, the first annular rim including at least two notches therein for receiving a portion of a cable, the first flange comprising,
      a plurality of first spoke sections coupled to the central hub and extending to and coupled to the first annular rim of the first flange,
      a plurality of first open spaces disposed in the first flange between adjacent first spoke sections, each first open space defined by a portion of the first annular rim and two adjacent first spoke sections, each first open space disposed between the first annular rim and the surface of the central hub, and
      wherein each first open space and its adjacent portion of the first annular rim are capable of operating as a carrying handle for the cable reel; and
   a second flange coupled to the second end of the central hub and having a second annular rim defining a second outer periphery, the second flange comprising,
      a plurality of second spoke sections coupled to the central hub and extending to and coupled to the second annular rim of the second flange,
      a plurality of second open spaces disposed in the second flange between adjacent second spoke sections, each second open space defined by a portion of the second annular rim and two adjacent second spoke sections,
      wherein each second open space and its adjacent portion of the second annular rim are capable of operating as a carrying handle for the cable reel; and
   wherein at least one of the notches is disposed in the first annular rim of the first flange and disposed within a portion of a spoke section, the spoke section rigidly securing the first annular rim to a central portion of the first flange; and
   a cable assembly having a cable, a first connector and a second connector, the first and second connectors coupled to respective ends of the cable, the cable further comprising,
      a first portion wound around the central hub, and
      a second portion wound around a secondary hub.

8. The cable reel assembly in accordance with claim 7 wherein the central hub comprises a first portion and a second portion;
   the first portion of the central hub, the first flange and the secondary hub comprise plastic reinforced material and are formed together as a single unitary piece; and the second portion of the central hub and the second flange comprise plastic reinforced material and are formed together as a single unitary piece.

9. The cable reel assembly in accordance with claim 7 wherein the cable reel further comprises a retractable handle.

10. A cable reel comprising:
a central hub having a first end and a second end and a surface;
a first flange coupled to the first end of the central hub and having a first annular rim defining an first outer periphery and a first side periphery, the first annular rim including at least one notch therein for receiving a portion of a cable, the first flange comprising,
at least four first spoke sections coupled to the central hub and extending to and coupled to the first annular rim of the first flange,
at least four first open spaces disposed in the first flange between adjacent first spoke sections, each first open space defined by a portion of the first annular rim and two adjacent first spoke sections, each first open space disposed between the first annular rim and the surface of the central hub, and
wherein each first open space and its adjacent portion of the first annular rim are capable of operating as a carrying handle for the cable reel;
a second flange coupled to the second end of the central hub and having a second annular rim defining a second outer periphery, the second flange comprising,
at least four second spoke sections coupled to the central hub and extending to and coupled to the second annular rim of the second flange, and
at least four second open spaces disposed in the second flange between adjacent second spoke sections, each second open space defined by a portion of the second annular rim and two adjacent second spoke sections, and
wherein each second open space and its adjacent portion of the second annular rim are capable of operating as a carrying handle for the cable reel;
a secondary hub adjacent the central hub and having a first end and a second end, the first flange coupled to the first end of the secondary hub;
a third flange coupled to the second end of the secondary hub;
wherein the secondary hub and third flange are disposed within the first side periphery of the first flange; and
wherein the at least one notch is disposed in the first annular rim of the first flange and disposed within a portion of a spoke section, the spoke section rigidly securing the first annular rim to a central portion of the first flange or the first end of the central hub.

11. The cable reel in accordance with claim 10 wherein the central hub comprises a first portion and a second portion;
the first portion of the central hub, the first flange and the secondary hub comprise plastic reinforced material and are formed together as a single unitary piece; and
the second portion of the central hub and the second flange comprise plastic reinforced material and are formed together as a single unitary piece.

12. The cable reel in accordance with claim 10 wherein the cable reel further comprises a retractable handle.

13. The cable reel in accordance with claim 12 further comprising:
a cable assembly having a cable, a first connector and a second connector, the first and second connectors coupled to respective ends of the cable, the cable further comprising,
a first portion wound around the central hub, and
a second portion wound around a secondary hub.

14. A cable reel comprising:
a central hub having a first end and a second end and a surface;
a first flange coupled to the first end of the central hub and having a first annular rim defining a first outer periphery, the first annular rim including at least two notches therein for receiving a portion of a cable, the first flange comprising,
a plurality of first spoke sections coupled to the central hub and extending to and coupled to the first annular rim of the first flange,
a plurality of first open spaces disposed in the first flange between adjacent first spoke sections, each first open space defined by a portion of the first annular rim and two adjacent first spoke sections, each first open space disposed between the first annular rim and the surface of the central hub, and
wherein each first open space and its adjacent portion of the first annular rim are capable of operating as a carrying handle for the cable reel; and
a second flange coupled to the second end of the central hub and having a second annular rim defining a second outer periphery, the second flange comprising,
a plurality of second spoke sections coupled to the central hub and extending to and coupled to the second annular rim of the second flange,
a plurality of second open spaces disposed in the second flange between adjacent second spoke sections, each second open space defined by a portion of the second annular rim and two adjacent second spoke sections,
wherein each second open space and its adjacent portion of the second annular rim are capable of operating as a carrying handle for the cable reel; and
wherein at least one of the notches is disposed in the first annular rim of the first flange and disposed within a portion of a spoke section, the spoke section rigidly securing the first annular rim to the first end of the central hub.

15. The cable reel in accordance with claim 14 further comprising:
a secondary hub adjacent the central hub and having a first end and a second end, the first flange coupled to the first end of the secondary hub;
a third flange coupled to the second end of the secondary hub; and
wherein the secondary hub and third flange are disposed within a side periphery of the first flange defined by the first annular rim of the first flange.

16. The cable reel in accordance with claim 14 wherein the central hub comprises a first portion and a second portion;
the first portion of the central hub and the first flange comprise plastic reinforced material and are formed together as a single unitary piece; and
the second portion of the central hub and the second flange comprise plastic reinforced material and are formed together as a single unitary piece.

17. The cable reel in accordance with claim 14 further comprising a retractable handle.

18. The cable reel in accordance with claim 14 wherein the number of first spoke sections equals four or more and the number of first open areas equals four or more.

19. The cable reel in accordance with claim 18 wherein the number of second spoke sections equals four or more and the number of second open areas equals four or more.

20. The cable reel in accordance with claim 14 wherein each notch is disposed in the first annular rim of the first flange and disposed within a portion of a spoke section, the spoke section rigidly securing the first annular rim to a central portion of the first flange.

\* \* \* \* \*